(12) United States Patent
Nakamura

(10) Patent No.: US 8,121,384 B2
(45) Date of Patent: Feb. 21, 2012

(54) METHOD AND APPARATUS FOR MAGNETIC CHARACTER RECOGNITION

(75) Inventor: Hiroshi Nakamura, Nagano (JP)

(73) Assignee: Nidec Sankyo Corporation (JP)

( * ) Notice: Subject to any disclaimer, the term of this patent is extended or adjusted under 35 U.S.C. 154(b) by 903 days.

(21) Appl. No.: 12/123,090

(22) Filed: May 19, 2008

(65) Prior Publication Data

US 2008/0285839 A1    Nov. 20, 2008

(30) Foreign Application Priority Data

May 17, 2007   (JP) ................................. 2007-131232
Jan. 17, 2008   (JP) ................................. 2008-007657

(51) Int. Cl.
    *G06K 9/00*    (2006.01)
(52) U.S. Cl. ....................... 382/139; 382/320
(58) Field of Classification Search ................. 382/139, 382/137, 173, 176, 177, 320
    See application file for complete search history.

(56) References Cited

U.S. PATENT DOCUMENTS

| | | | | |
|---|---|---|---|---|
| 3,987,411 A | * | 10/1976 | Kruklitis et al. | 382/208 |
| 5,524,063 A | * | 6/1996 | Henrot | 382/139 |
| 8,023,718 B1 | * | 9/2011 | Gudenburr et al. | 382/139 |
| 2007/0133859 A1 | * | 6/2007 | Babanats et al. | 382/139 |
| 2008/0123933 A1 | * | 5/2008 | Nakamura | 382/139 |
| 2009/0324106 A1 | * | 12/2009 | Nakamura | 382/224 |

FOREIGN PATENT DOCUMENTS

| | | |
|---|---|---|
| JP | 2001-351062 | 12/2001 |
| JP | 2005-157982 | 6/2005 |
| JP | 2005157982 A * | 6/2005 |

* cited by examiner

*Primary Examiner* — Aaron W Carter
(74) *Attorney, Agent, or Firm* — Cantor Colburn LLP

(57) ABSTRACT

A method for magnetic character recognition may include preparing standard array data of peak intervals; generating a regeneration waveform out of a character string of magnetic characters printed on a surface of an information data recording medium; segmenting a character waveform of each magnetic character out of the regeneration waveform; generating array data of peak intervals out of an array pattern of a plurality of intervals between peaks that are included in the character waveform; and comparing the array data of peak intervals with the standard array data of peak intervals; wherein, based on a comparison result of comparing the array data of peak intervals with the standard array data of peak intervals, a read character is identified with a character corresponding to an array data of peak intervals that shows the highest coincidence.

5 Claims, 11 Drawing Sheets

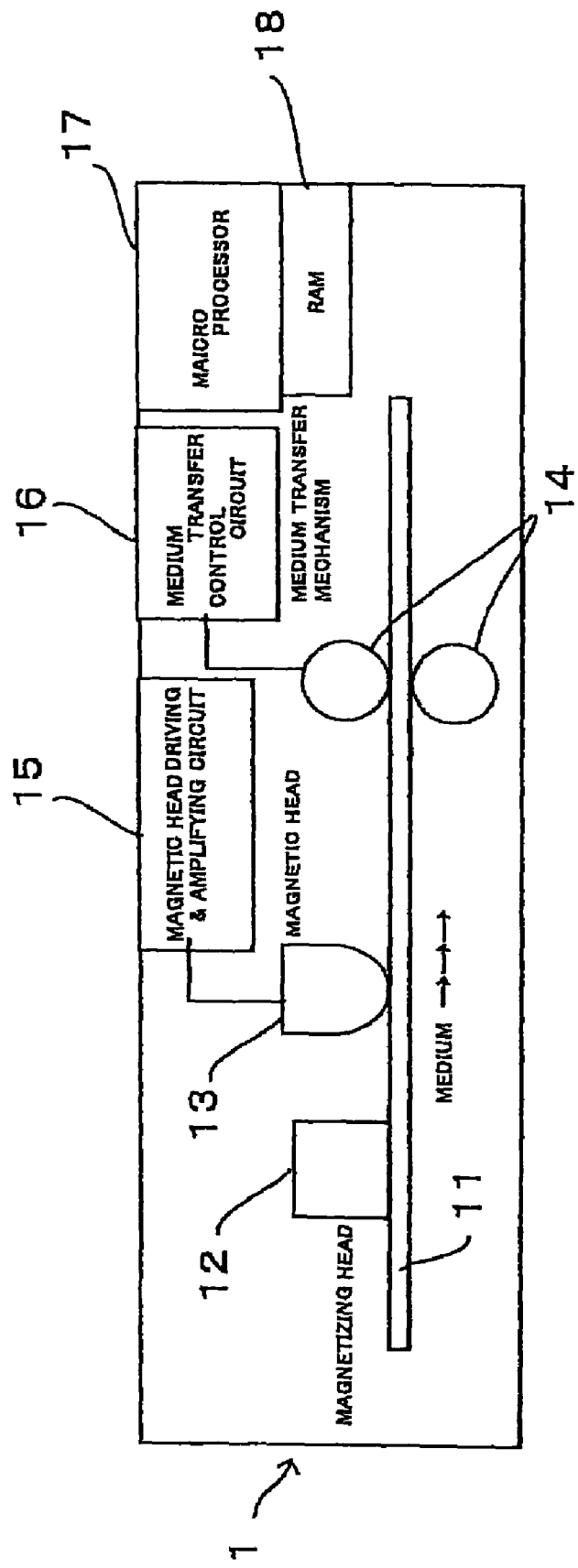

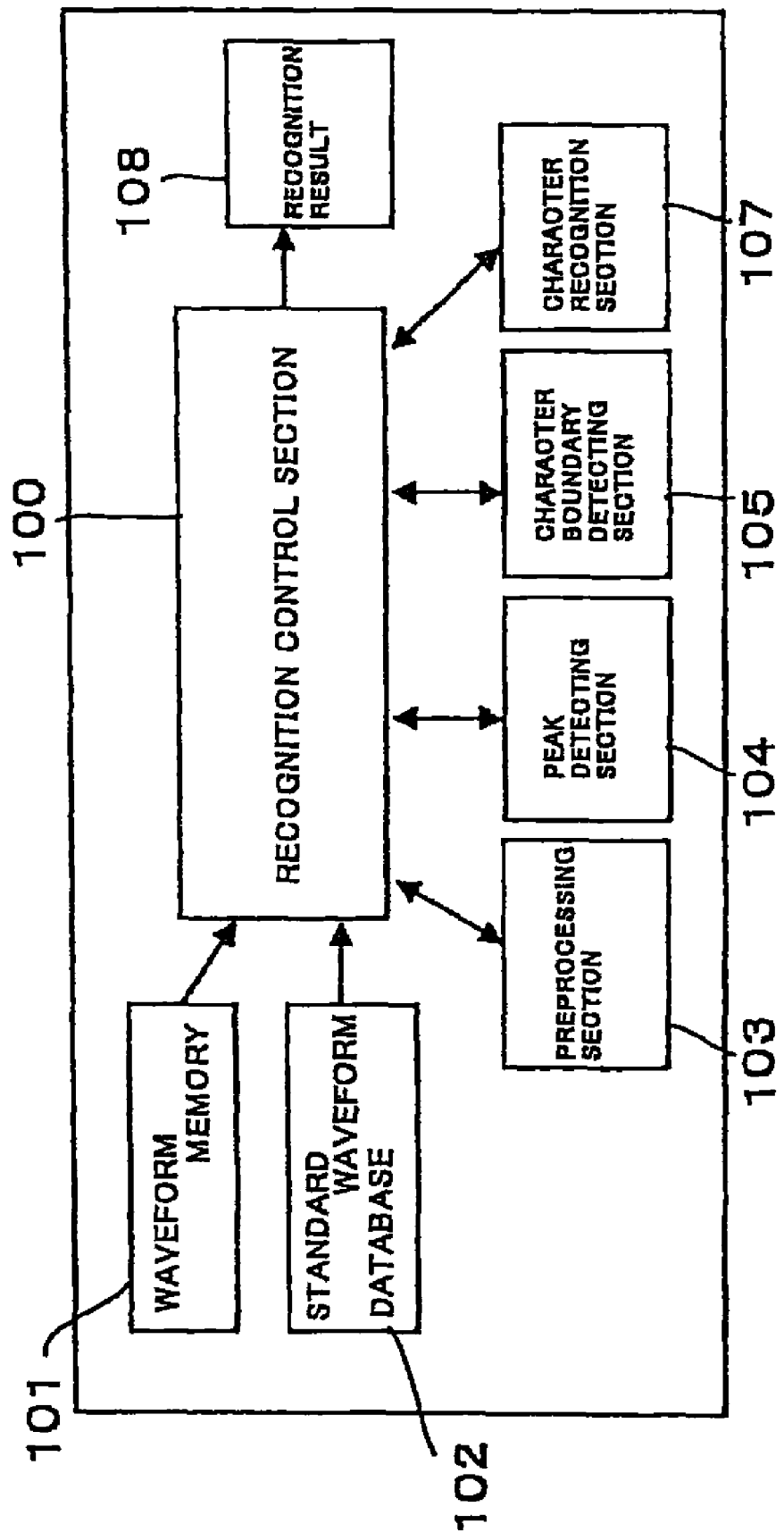

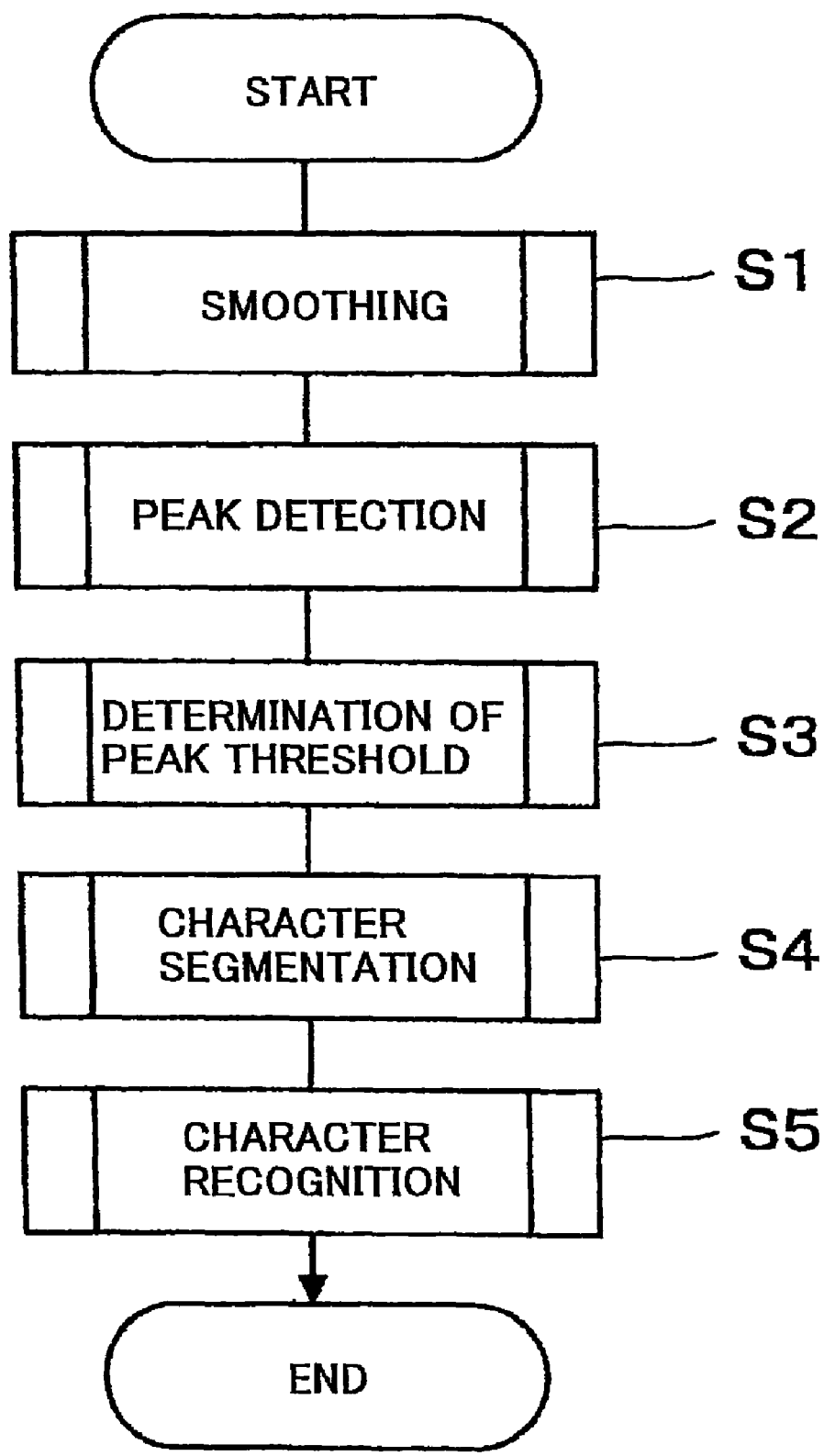

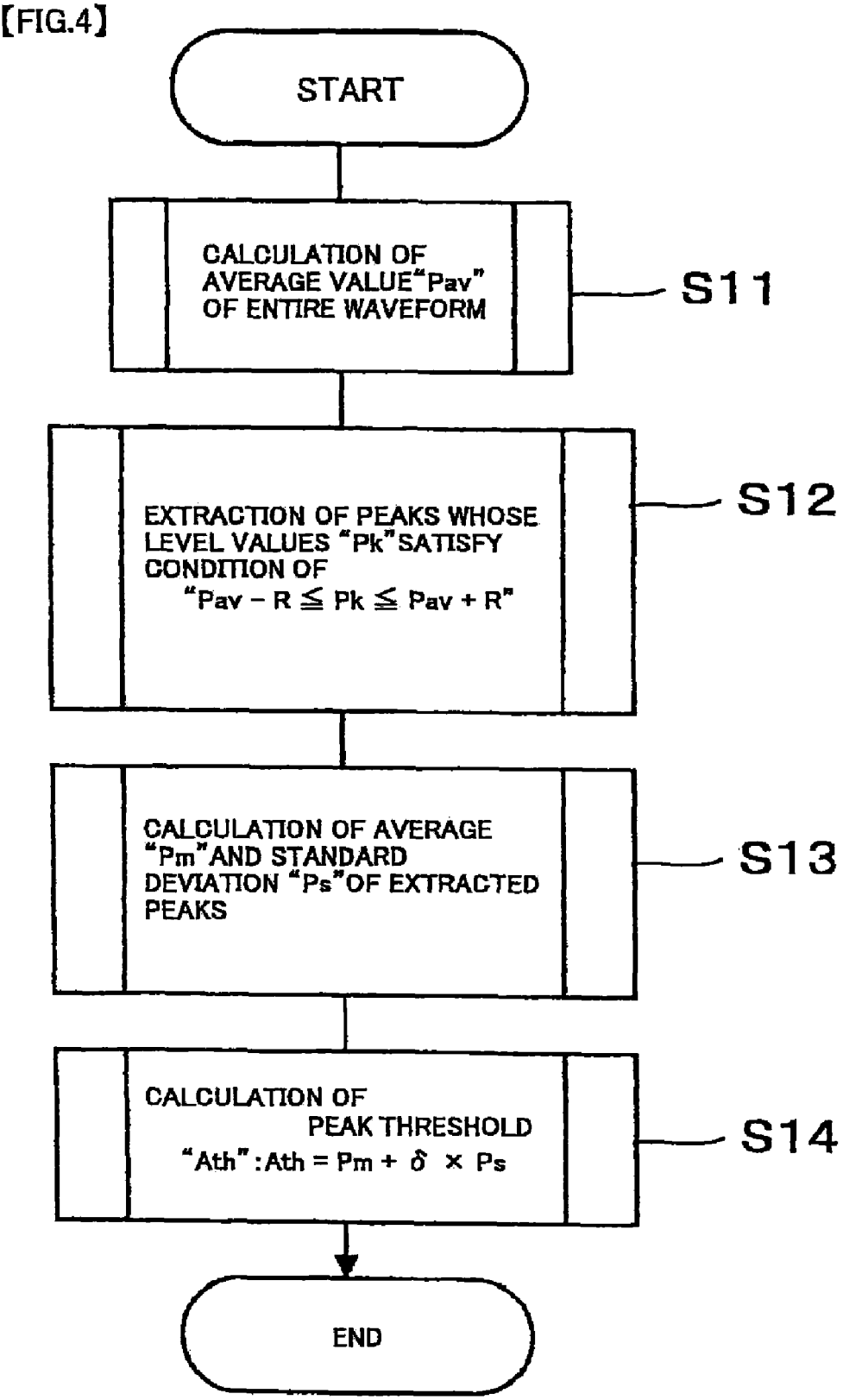

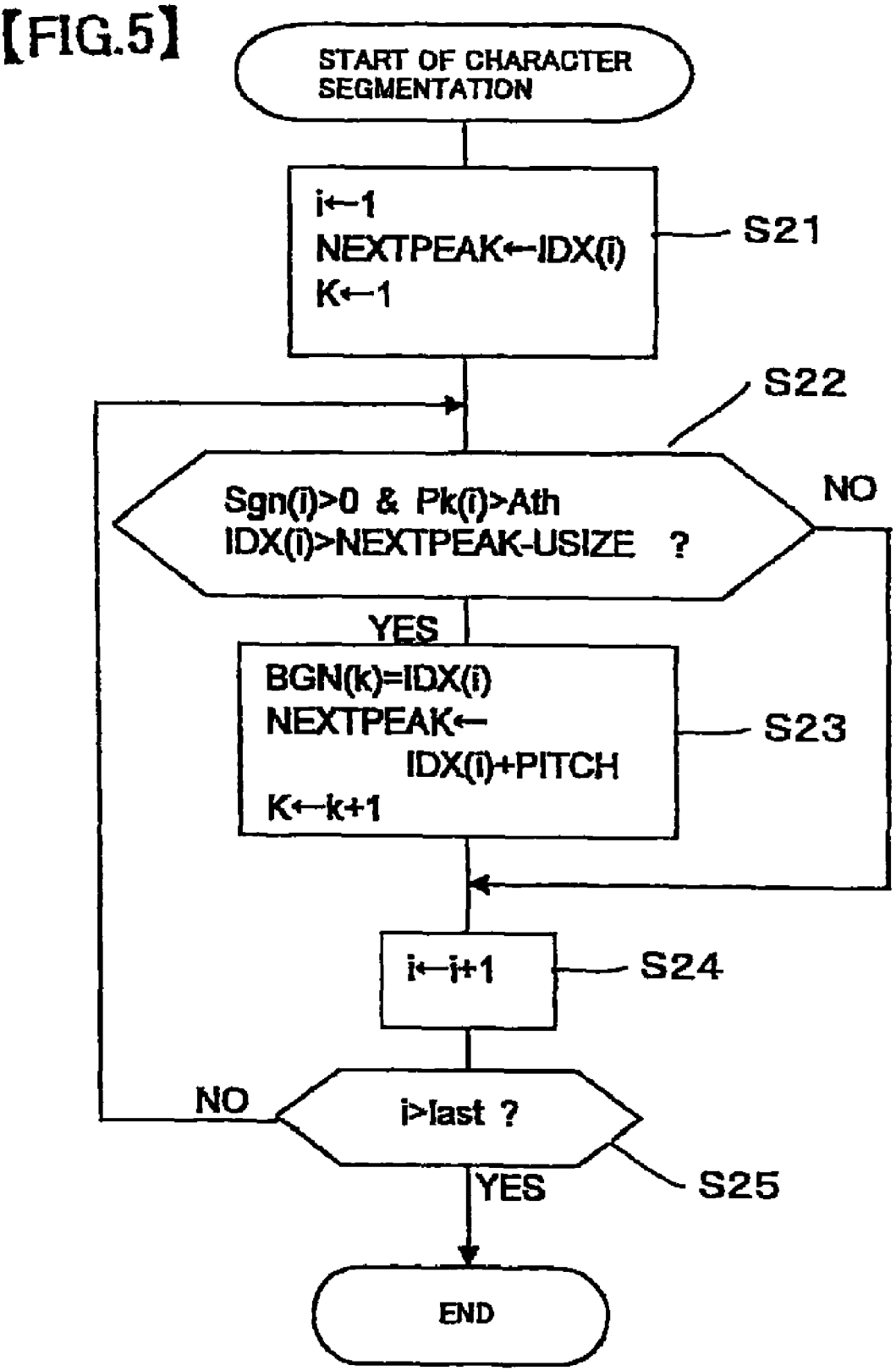

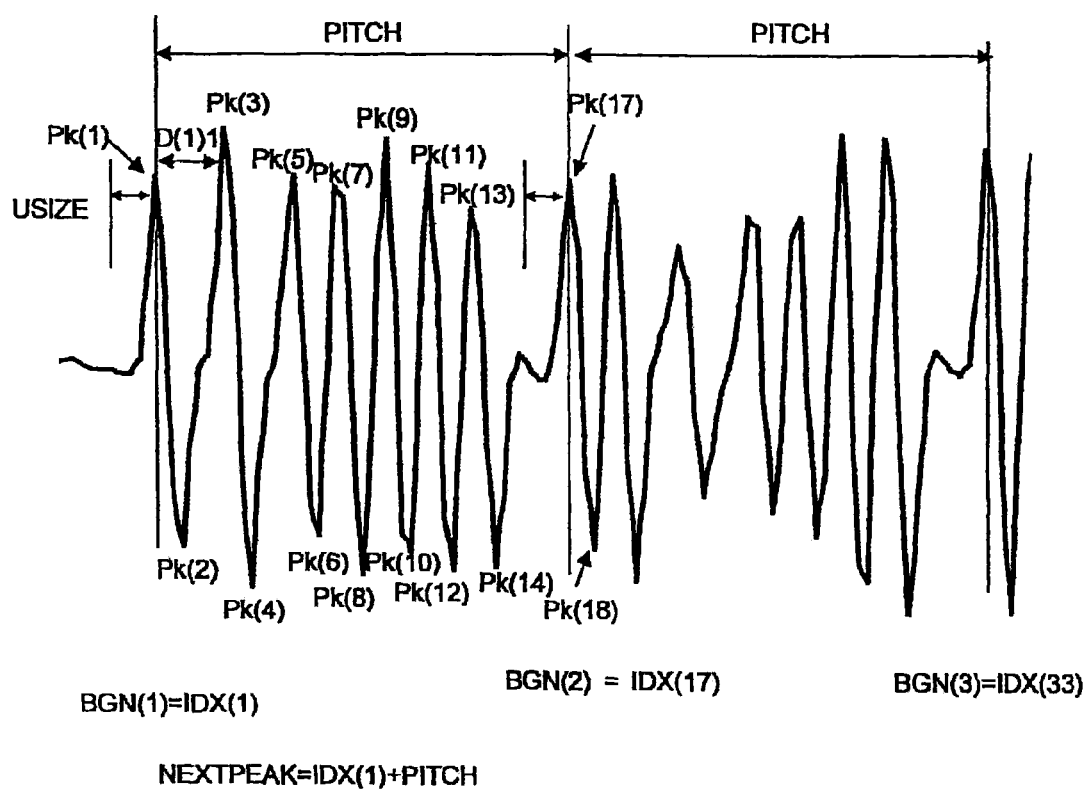

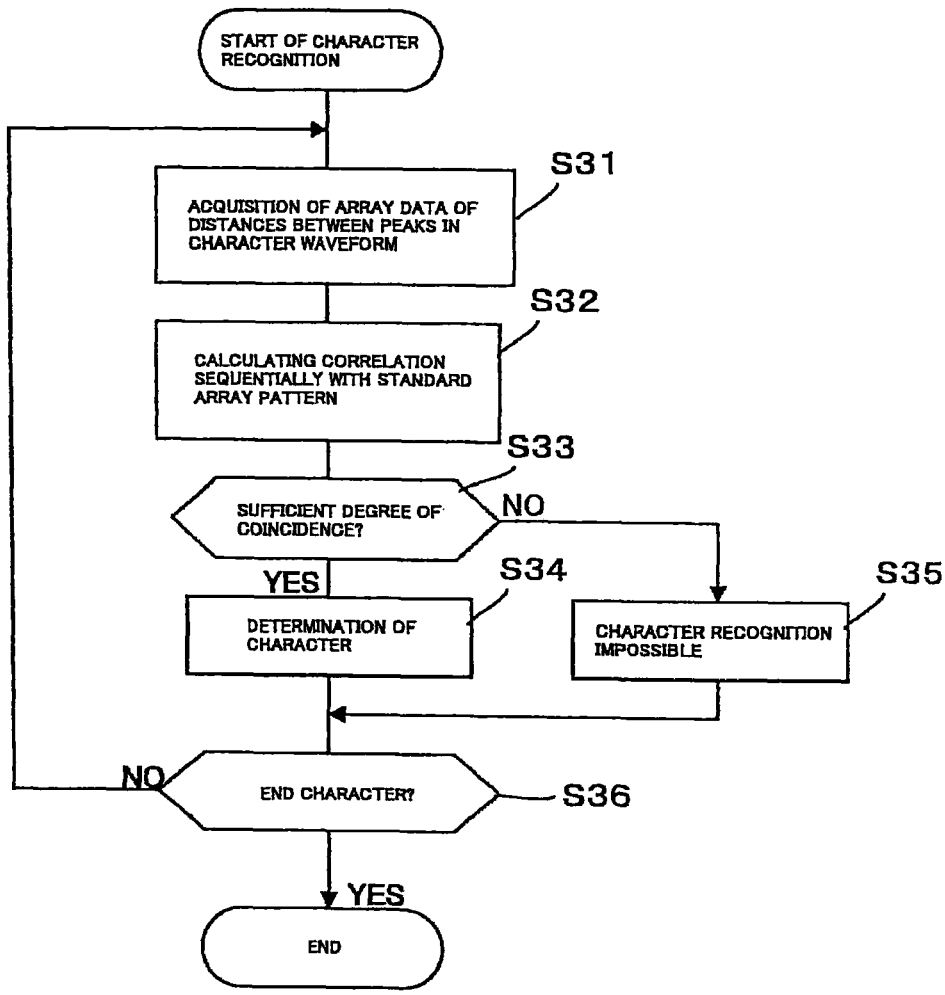
[FIG.7A]

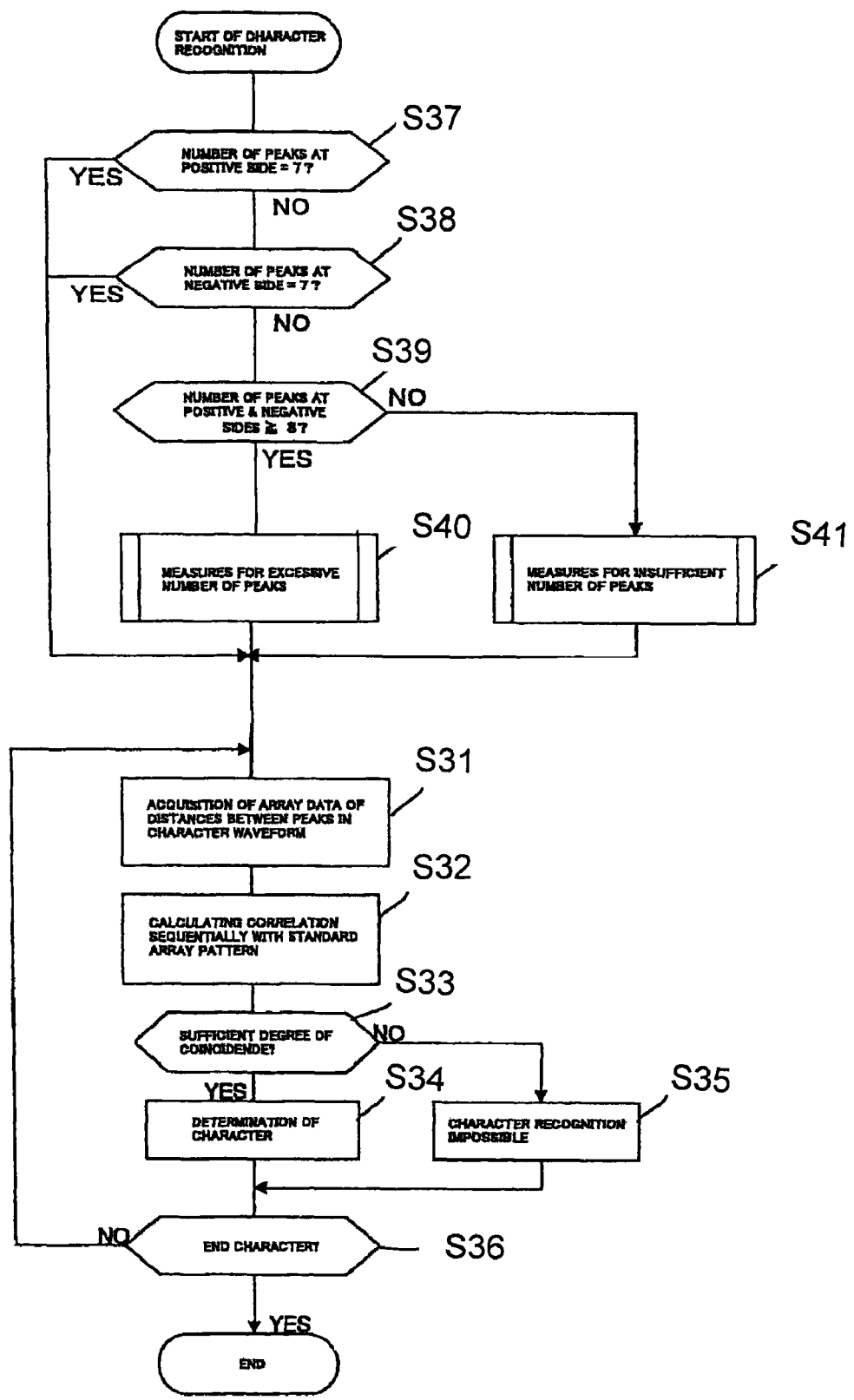

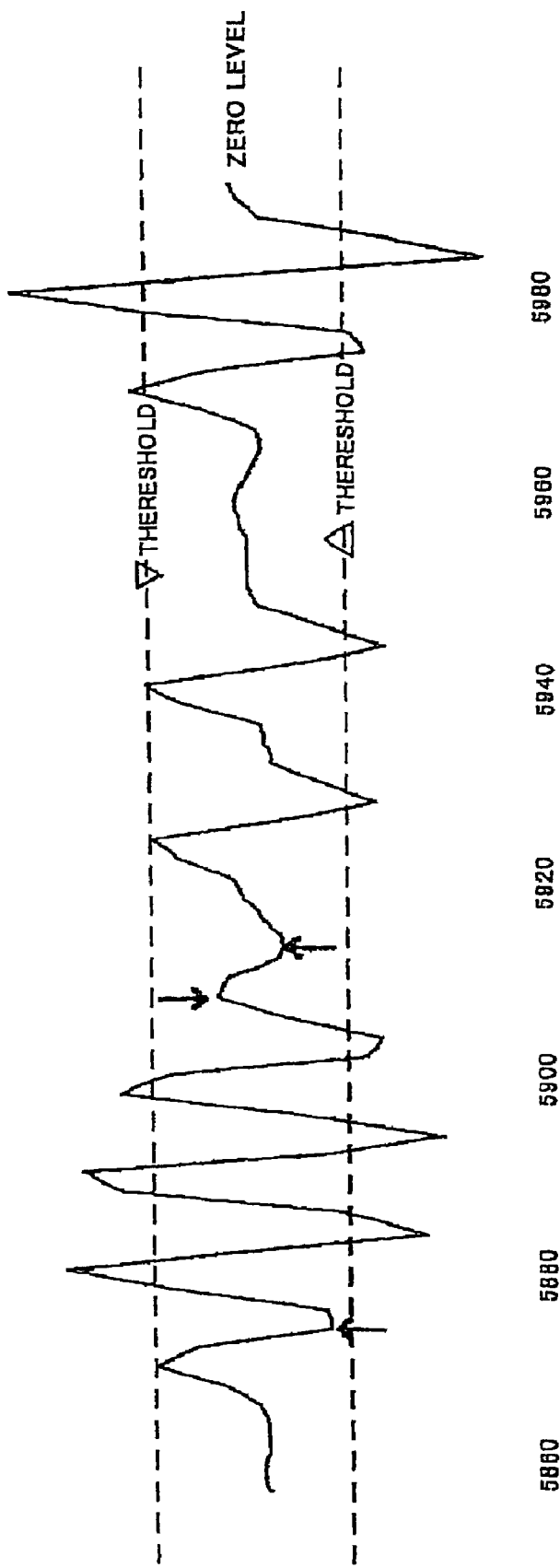

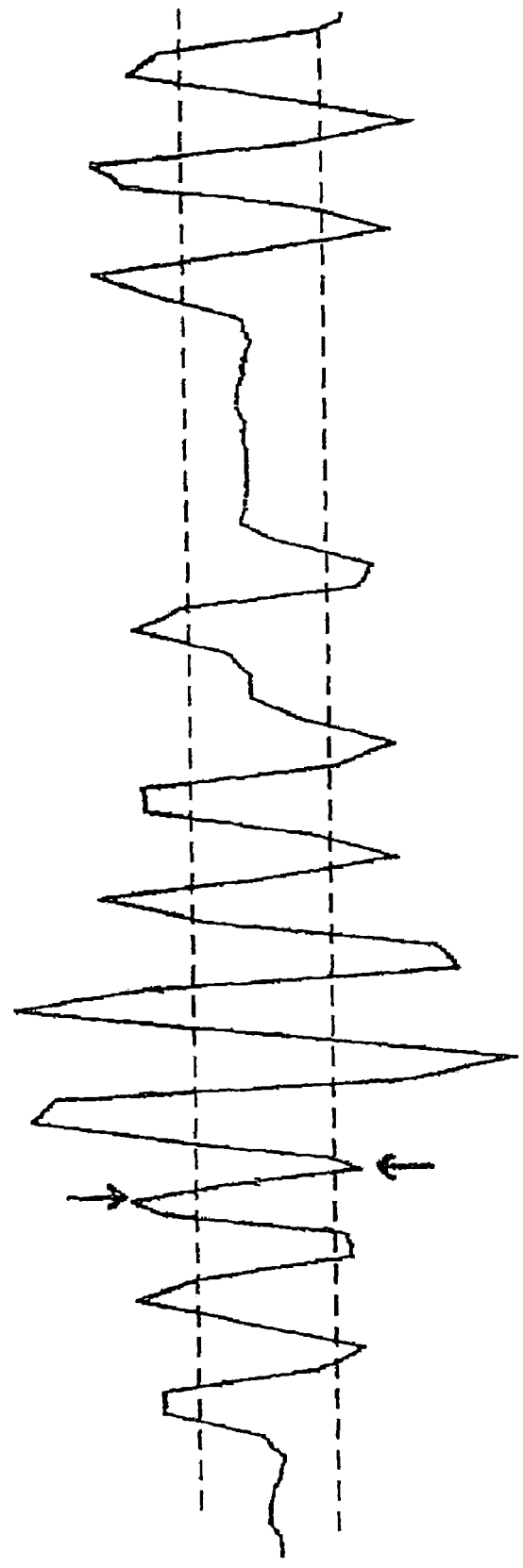
[FIG.10]

METHOD AND APPARATUS FOR MAGNETIC CHARACTER RECOGNITION

CROSS REFERENCE TO RELATED APPLICATIONS

The present application claims priority under 35 U.S.C. §119 to Japanese Application No. 2007-131232 filed on May 17, 2007 and Japanese Application No. 2008-007657 filed on Jan. 17, 2008, the contents of both of which are incorporated herein by reference.

FIELD OF THE INVENTION

The present invention relates to a method and an apparatus for magnetic character recognition for reading a character string printed with magnetic ink characters and generating a regeneration waveform for character recognition, and particularly to a method and an apparatus thereof that enables character recognition with high accuracy.

BACKGROUND

Conventionally, there have been disclosed various methods in which a part of a medium surface, where magnetic ink characters (MICR characters) are printed, is read by using a magnetic head so as to obtain a magnetic regeneration signal for the purpose of character recognition. The magnetic ink characters (MICR characters) are used for checks and the like to be used in financial facilities. Character types thereof typically include E13B and CMC7, and the character types are standardized by ISO 1004 and so on.

At the initial stage in the history of development of the technology for recognizing MICR characters, a major method for character recognition involved reading a magnetic character line by using a magnetic head, inputting a waveform of the magnetic regeneration signal into a logical circuit, and then recognizing the character according to characteristics of a peak position and an output level in the waveform of the magnetic regeneration signal. However, in association with technical advancement of the performance of microprocessors as well as enhancement of memory units in relation with their high-speed operation and large capacity, character recognition by processing a magnetic signal with software has been increasing these years. Furthermore, examples of character recognition include some cases in which not only a magnetic signal but also an image captured by scanning a medium are used together.

In a disclosed method in which a magnetic signal is used, peak intervals in a waveform of a magnetic regeneration signal of a character are determined; and then, according to a combination pattern of the peak intervals, the waveform is correlated with a character having a combination pattern of the peak intervals For example, refer to Patent Document 1 and Patent Document 2, as indicated below:

[Patent Document 1]
Japanese Unexamined Patent Publication (Kokai) No. JP2001-351062
[Patent Document 2]
Japanese Unexamined Patent Publication (Kokai) No. JP2005-157982

However, among checks and so on used practically in the marketplace, some include poorly printed magnetic ink characters even though the characters are still within an allowable range. Therefore, it is required that the technology of character recognition shall recognize those characters within such a border range, being free from any false character recognition.

To describe more in detail, magnetic ink characters being practically used include variations, depending on qualities of magnetic ink, a printing machine, irregularities of medium transfer speed and magnetic properties of a regeneration magnetic head and a magnetizing head. Eventually there arise alterations in the magnetic ink characters; such as a high magnetic force, a low magnetic force, a thick-lined character, a thin-lined character, tilt, and so on.

Furthermore, depending on using condition and storage condition of a check, there may also arise other alterations in the characters, such as having an opening, an unclear character, and a blurring character, etc. so that waveforms of magnetic regeneration signals are deformed in various ways. Particularly, if the check has been stored while being folded, width and intervals of the characters become altered when a folded part is scanned so that accuracy of the magnetic character recognition may be impaired.

Therefore, the methods disclosed by Patent Document 1 and Patent Document 2 described above include procedures through which each interval between peaks in the magnetic waveform is determined so as to convert the interval pattern into '1' or '0' when the interval is wider or narrower than a prescribed interval, respectively. Then, depending on whether or not an array pattern of '1' and '0' agrees with a regular array pattern, presence of an error is detected.

However, those methods are likely to make a misjudgment and probably lead to false recognition when the peak interval in the magnetic waveform is sized around the middle between a wide interval and a narrow interval.

At least an embodiment of the present invention provides a method and an apparatus for magnetic character recognition for recognizing magnetic characters with high accuracy, even when there exists deformation in a pattern of the magnetic waveform.

SUMMARY OF THE INVENTION

To solve the problem identified above, at least an embodiment of the present invention provides the following aspects.

(1) A method for magnetic character recognition including: an array data preparation process that prepares standard array data of peak intervals, out of an array pattern of a plurality of intervals between peaks that are included in a standard character waveform of each magnetic character, in accordance with a standard waveform that is used as a datum for reading a character string, including a plurality of magnetic characters printed with magnetic ink, by a magnetic head; a waveform generation process for generating a regeneration waveform out of a character string of magnetic characters printed on a surface of an information data recording medium; a segmentation process for segmenting a character waveform of each magnetic character out of the regeneration waveform; an array data generation process for generating array data of peak intervals out of an array pattern of a plurality of intervals between peaks that are included in the character waveform; and a comparison process for comparing the array data of peak intervals with the standard array data of peak intervals; wherein, based on a comparison result by the comparison process, a read character is identified with a character corresponding to an array data of peak intervals that shows the highest coincidence.

According to at least an embodiment of the present invention; standard array data of peak intervals is prepared at first out of an array pattern of a plurality of intervals between peaks that are included in a standard character waveform of each magnetic character. Subsequently, a regeneration waveform is generated out of a character string of magnetic characters, and a character waveform of each magnetic character is segmented. Then, array data of peak intervals is generated out of an array pattern of a plurality of intervals between peaks that are included in the character waveform, and the array data of peak intervals is compared with the standard array data of peak intervals. As a result, a read character is identified with a character corresponding to an array data of peak intervals that shows the highest coincidence. Therefore, the magnetic character recognition can be carried out with high accuracy.

In other words, the method for magnetic character recognition according to at least an embodiment of the present invention does not need to make a comparison on the dimension of peak intervals nor carry out any pattern conversion so that the magnetic character recognition is unlikely to make a misjudgment even when the peak interval in the magnetic waveform is sized around the middle between a wide interval and a narrow interval. As a result, the method for magnetic character recognition ensures the improvement in accuracy of the magnetic character recognition.

(2) The method for magnetic character recognition according to item (1): wherein a read character is identified with a character corresponding to a correlation coefficient showing the highest coincidence when the array data of peak intervals and the standard array data of peak intervals are compared by using a correlation coefficient.

According to at least an embodiment of the present invention; a read character is identified with a character corresponding to a correlation coefficient showing the highest coincidence when the array data of peak intervals and the standard array data of peak intervals are compared by using a correlation coefficient. Therefore, the method for magnetic character recognition does not need to convert distances between peaks into any distance pattern so that it ensures a decrease in the operation load.

(3) The method for magnetic character recognition according to item (1) wherein, depending on if there exists any peak having intensity greater than a specified intensity level within a range for one character, it is judged in the segmentation process whether the part of the regeneration waveform is dealt with as a character region or a region with no signal.

According to at least an embodiment of the present invention; depending on if there exists any peak having intensity greater than a specified intensity level within a range for one character, it is judged in the segmentation process whether the part of the regeneration waveform is dealt with as a character region or a region with no signal. Therefore, the method for magnetic character recognition is unlikely to get influenced by noise, and eventually the method ensures the improvement in accuracy of the magnetic character recognition.

(4) The method for magnetic character recognition according to item (3): wherein all peak values included in the regeneration waveform are calculated and the variance of the values of the peaks, which exist within a certain range in relation to the average value of the regeneration waveform, is calculated in the segmentation process; and then the specified intensity is determined according to the variance.

According to at least an embodiment of the present invention; all peak values included in the regeneration waveform are calculated and the variance of the values of the peaks, which exist within a certain range in relation to the average value of the regeneration waveform, is calculated in the segmentation process; and then the specified intensity is determined according to the variance. Therefore, the method for magnetic character recognition is unlikely to get influenced by level fluctuation of the noise that results from characteristics of the character recognition system, and eventually the method ensures the improvement in accuracy of the magnetic character recognition.

(5) An apparatus for magnetic character recognition including: an array data memory section for storing an array pattern of a plurality of intervals between peaks that are included in a standard character waveform of each magnetic character as standard array data of peak intervals; in accordance with a standard waveform that is used as a datum for reading a character string, including a plurality of magnetic characters printed with magnetic ink, by a magnetic head; a waveform generating section for generating a regeneration waveform out of a character string of magnetic characters printed on a surface of an information data recording medium; a segmenting section for segmenting a character waveform of each magnetic character out of the regeneration waveform; an array data generating section for generating array data of peak intervals out of an array pattern of a plurality of intervals between peaks that are included in the character waveform; and a comparing section for comparing the array data of peak intervals with the standard array data of peak intervals; wherein, based on a comparison result by the comparing section, a read character is identified with a character corresponding to an array data of peak intervals that shows the highest coincidence.

According to at least an embodiment of the present invention; an apparatus for magnetic character recognition includes: an array data memory section, a waveform generating section, a segmenting section, an array data generating section, and a comparing section; and based on a comparison result by the comparing section, a read character is identified as described above with a character corresponding to an array data of peak intervals that shows the highest coincidence in the comparison between the array data of peak intervals and the standard array data of peak intervals. Therefore, the magnetic character recognition can be carried out with high accuracy.

(6) A method for magnetic character recognition including: a waveform generation process for generating a regeneration waveform out of a character string including a plurality of magnetic characters printed on a surface of an information data recording medium with magnetic ink; a segmentation process for segmenting a character waveform of each magnetic character out of the regeneration waveform; a peak counting process for counting the number of peaks included in the character waveform in accordance with a prescribed threshold; a peak number adjusting process in which the number of peaks obtained through the peak counting process is compared with the standard number of peaks included in the standard character waveform, and an adjustment is so made as to equalize the number of peaks and the standard number of peaks; an array data generation process for generating array data of peak intervals out of an array pattern of a plurality of intervals between peaks that are included in the character waveform, being based on the number of peaks equalized to the standard number of peaks; and a comparison process for comparing the array data of peak intervals with the standard array data of peak intervals generated in accordance with a standard waveform that is used as a datum for reading a character string, including a plurality of magnetic characters printed with magnetic ink, by a magnetic head; wherein, based on a comparison result by the comparison process, a read character is identified with a character corresponding to an array data of peak intervals that shows high coincidence.

According to at least an embodiment of the present invention; a regeneration waveform is generated out of a character string of magnetic characters; a character waveform of each character is segmented; the number of peaks included in the character waveform is counted in accordance with a prescribed threshold; the number of peaks obtained is compared with the standard number of peaks included in the standard character waveform, and an adjustment is so made as to equalize the number of peaks and the standard number of peaks; array data of peak intervals is generated out of an array pattern of a plurality of intervals between peaks that are included in the character waveform, being based on the number of peaks equalized to the standard number of peaks; and the array data of peak intervals is compared with the standard array data of peak intervals. As a result, a read character is identified with a character corresponding to an array data of peak intervals that shows high coincidence, and therefore, the magnetic character recognition can be carried out with high accuracy. Incidentally, standard array data of peak intervals may be prepared beforehand out of an array pattern of a plurality of intervals between peaks that are included in a standard character waveform of each magnetic character, but not limited to the configuration described above.

In other words, the method for magnetic character recognition according to at least an embodiment of the present invention does not need to make a comparison on the dimension of peak intervals nor carry out any pattern conversion so that the magnetic character recognition is unlikely to make a misjudgment even when the peak interval in the magnetic waveform is sized around the middle between a wide interval and a narrow interval. As a result, the method for magnetic character recognition ensures the improvement in accuracy of the magnetic character recognition. Particularly, an adjustment is so made as to equalize the number of peaks included in the character waveform and the standard number of peaks included in the standard character waveform. Therefore, the character recognition is unlikely to get influenced by damage on peaks due to a void, spot, etc., and/or waveform deformation due to a quasi peak; and eventually the method ensures the further improvement in accuracy of the magnetic character recognition.

(7) The method for magnetic character recognition: wherein the peak number adjusting process makes an adjustment so as to equalize the number of peaks and the standard number of peaks by changing the prescribed threshold.

According to at least an embodiment of the present invention; the peak number adjusting process described above makes an adjustment so as to equalize the number of peaks and the standard number of peaks by changing the prescribed threshold (level). Namely, if the number of peaks is less than the standard number of peaks, the prescribed threshold is set to be closer to the zero level. Contrarily, if the number of peaks is more than the standard number of peaks, the prescribed threshold is set to be more distant from the zero level. Owing to this adjusting process, the array data of peak intervals can be generated in accordance with the number of peaks equalized to the standard number of peaks, even when the regeneration waveform generated through the waveform generation process is deformed so that the number of peaks included in the character waveform is different from the standard number of peaks included in the standard character waveform. Eventually the method ensures the improvement in accuracy of the magnetic character recognition. Furthermore, the software operations for changing the prescribed threshold are simple and relatively light-duty, and therefore they prevent the peak number adjusting process from becoming complex and heavy-laden (software-wise).

(8) The method for magnetic character recognition: wherein the peak number adjusting process makes an adjustment so as to equalize the number of peaks and the standard number of peaks by summing up a couple of neighboring two peak intervals in the array pattern if the number of peaks is more than the standard number of peaks.

According to at least an embodiment of the present invention; the peak number adjusting process makes an adjustment so as to equalize the number of peaks and the standard number of peaks by summing up a couple of neighboring two peak intervals in the array pattern if the number of peaks is more than the standard number of peaks. Owing to this adjusting process, the array data of peak intervals can be generated in accordance with the number of peaks equalized to the standard number of peaks, even when the regeneration waveform generated through the waveform generation process is deformed so that the number of peaks included in the character waveform is different from the standard number of peaks included in the standard character waveform. Eventually the method ensures the improvement in accuracy of the magnetic character recognition. Furthermore, in this aspect as well, the software operations for changing the prescribed threshold are simple and relatively light-duty, and therefore they prevent the peak number adjusting process from becoming complex and heavy-laden (software-wise).

(9) The method for magnetic character recognition: wherein the peak counting process detects the number of peaks at both the positive and negative sides of the regeneration waveform.

According to at least an embodiment of the present invention; the peak number adjusting process detects the number of peaks at both the positive and negative sides of the regeneration waveform. Eventually the method ensures the improvement in accuracy of the character recognition. Namely, depending on if the number of peaks is equal to the prescribed number of peaks at both the positive and negative sides, either of the sides, or neither of the sides, a secondary analysis is carried out to add or delete a peak(s) in the peak number adjusting process for matching the array data of peak intervals. Therefore, the method ensures the improvement in accuracy of the character recognition.

(10) An apparatus for magnetic character recognition including: an array data memory section for storing an array pattern of a plurality of intervals between peaks that are included in a standard character waveform of each magnetic character as standard array data of peak intervals; in accordance with a standard waveform that is used as a datum for reading a character string, including a plurality of magnetic characters printed with magnetic ink, by a magnetic head; a waveform generating section for generating a regeneration waveform out of a character string of magnetic characters printed on a surface of an information data recording medium; a segmenting section for segmenting a character waveform of each magnetic character out of the regeneration waveform; a peak counting means for counting the number of peaks included in the character waveform in accordance with a prescribed threshold; a peak number adjusting means in which the number of peaks obtained through the peak counting means is compared with the standard number of peaks included in the standard character waveform, and an adjustment is so made as to equalize the number of peaks and the standard number of peaks; an array data generating section for generating array data of peak intervals out of an array pattern of a plurality of intervals between peaks that are included in the character waveform, being based on the number of peaks equalized to the standard number of peaks; and a comparing section for comparing the array data of peak intervals with the standard array data of peak intervals; wherein, based on a comparison result by the comparing section, a read character is identified with a character corresponding to an array data of peak intervals that shows high coincidence.

According to at least an embodiment of the present invention; an apparatus for magnetic character recognition includes: an array data memory section, a waveform generating section, a segmenting section, a peak counting means, a peak number adjusting means, an array data generating section, and a comparing section; and based on a comparison result by the comparing section, a read character is identified with a character corresponding to an array data of peak intervals that shows high coincidence in the comparison between the array data of peak intervals and the standard array data of peak intervals. Therefore, the magnetic character recognition can be carried out with high accuracy.

According to at least an embodiment of the present invention, a read character is identified with a character corresponding to an array data of peak intervals that shows high coincidence in comparison between the array data of peak intervals and standard array data of peak intervals. Therefore, magnetic character recognition can be carried out with high accuracy even when there exists deformation in the magnetic waveform pattern. Particularly, when the array data of peak intervals is generated, an adjustment is so made as to equalize the number of peaks included in the character waveform and the standard number of peaks included in the standard character waveform; and therefore the character recognition can be carried out, being unlikely to get influenced by damage on peaks due to a void, spot, etc., and/or waveform deformation due to a quasi peak.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a schematic view of showing a structure of a magnetic character recognition apparatus in accordance with at least an embodiment of the present invention.

FIG. 2 is a block diagram showing an electrical configuration of the magnetic character recognition apparatus in accordance with at least an embodiment of the present invention;

FIG. 3 is a flowchart showing a general workflow of a magnetic character recognition method in accordance with at least an embodiment of the present invention.

FIG. 4 is a flowchart describing details of operation of determining the peak threshold at Step S3 in FIG. 3.

FIG. 5 is a flowchart showing a detailed workflow of the character segmentation (Step S4) described in the flowchart of FIG. 3.

FIG. 6 is a drawing that illustrates an example of MICR regeneration waveform data.

FIG. 7 includes flowcharts showing a detailed workflow of the character recognition (Step S5) described in the flowchart of FIG. 3. Namely, FIG. 7A is a flowchart relating to the first embodiment, while FIG. 7B is a flowchart relating to the second embodiment.

FIG. 8 is an example of a line of magnetic characters printed on a medium such as a check.

FIG. 9 is a waveform in which the number of peaks is less than the standard number of peaks.

FIG. 10 is a waveform in which the number of peaks is more than the standard number of peaks.

DESCRIPTION OF THE PREFERRED EMBODIMENT

At least an embodiment of the present invention is described below with reference to the accompanying drawings.

(Magnetic Character Recognition Apparatus)

FIG. 1 is a schematic view of showing a structure of a magnetic character recognition apparatus 1 in accordance with at least an embodiment of the present invention. In at least an embodiment of the present invention, a check reader provided with an MICR function is taken up for explanation. FIG. 1 illustrates a configuration of a section mainly relating to MICR processing of the magnetic character recognition apparatus 1 in accordance with at least an embodiment of the present invention.

In FIG. 1, the magnetic character recognition apparatus 1 includes a paper medium transfer path 11, a magnetizing head 12 for re-magnetizing MICR characters (i.e., magnetic ink characters printed by using magnetic ink), a magnetic head 13 for detecting magnetism of the MICR characters, rollers 14 for transferring the paper medium, a magnetic head driving & amplifying circuit 15, a medium transfer control circuit 16, a micro processor 17, and a RAM 18. The magnetic head 13 and the rollers 14 are controlled by the magnetic head driving & amplifying circuit 15 and the medium transfer control circuit 16, respectively. Furthermore, the magnetic head driving & amplifying circuit 15 and the medium transfer control circuit 16 are operated according to commands from the micro processor 17 such as a CPU, etc., while the micro processor 17 uses the RAM 18 as a working memory.

Having been inserted into the paper medium transfer path 11, a check (i.e., an information data recording medium) is transferred by the rollers 14, and passes by the magnetizing head 12 and the magnetic head 13. The magnetizing head 12 re-magnetizes MICR characters printed on the check, while the magnetic head 13 detects magnetism of the MICR characters re-magnetized by the magnetizing head 12.

A regeneration waveform is generated out of the MICR characters read out by the magnetic head 13 (a waveform generation process by a waveform generating section). Then, the generated MICR regeneration waveform is digitalized and saved in an MICR waveform memory (for example the RAM 18). By using the MICR regeneration waveform data saved in the MICR waveform memory, magnetic character recognition processing is carried out in the microprocessor 17 built in the magnetic character recognition apparatus 1. Details of the magnetic character recognition are explained in a section of "Magnetic character recognition method" described later.

In the present embodiment, the magnetic character recognition is carried out in the microprocessor 17 built in the magnetic character recognition apparatus 1. However, the MICR regeneration waveform data may be transferred to a higher-level apparatus (such as an ATM), in which the magnetic character recognition is carried out. Furthermore, a one-dimensional image pickup device of a close coupling type for reading an image on a surface of a check may be placed at either of an upper side and a lower side of the paper medium transfer path 11 or even at both the sides. Still further, a printing block for printing a prescribed matter on the surface of the check may also be placed.

FIG. 2 is a block diagram showing an electrical configuration of the magnetic character recognition apparatus 1 in accordance with at least an embodiment of the present invention; illustrating a configuration of a section mainly relating to MICR processing.

In FIG. 2, the magnetic character recognition apparatus 1 includes a recognition control section 100, an MICR waveform memory 101 (such as an EEPROM), a standard waveform database 102 (such as an EEPROM), a preprocessing section 103, a peak detecting section 104, a character boundary detecting section 105, and a character recognition section 107. The magnetic character recognition apparatus may generate a recognition result 108.

The MICR regeneration waveform saved in the MICR waveform memory 101 is processed at first in the preprocessing section 103 for removing noise from an entire part of the MICR regeneration waveform through smoothing, in order to generate a shaped waveform from which noise has already been removed.

Subsequently, all peak information data included in the shaped MICR regeneration waveform are detected in the peak detecting section 104. Then, the peak information data such as a polarity (positive or negative), an intensity, a steeple position, and so on of each peak are saved. At the time, any peak provided with a peak intensity, which does not reach a predefined value, is excluded from the data.

Next, in accordance with the peak information data, a forefront peak of each magnetic ink character is detected from the MICR regeneration waveform in the character boundary detecting section 105. Then, a character boundary position for each character is determined, and a character waveform corresponding to each character is segmented (a segmentation process by a segmenting section).

Next, using the array pattern of a plurality of intervals between peaks that are included in the segmented character waveform, array data of peak intervals is generated (an array data generation process by an array data generating section). Then, in the character recognition section 107, the array data of peak intervals is compared with standard array data of peak intervals stored in the standard waveform database 102 (a comparison process by a comparing section) for magnetic character recognition.

Next, in the character recognition section 107, the number of peaks included in the character waveform is counted in accordance with a prescribed threshold (a peak counting process by a peak counting means). Furthermore, the number of peaks counted is compared with the standard number of peaks included in the standard character waveform, and an adjustment is so made as to equalize these two numbers of peaks (a peak number adjusting process by a peak number adjusting means: Details of the process and means are described later). Then, in accordance with the above number of peaks that agrees with the standard number of peaks; using the array pattern of a plurality of intervals between peaks that are included in the segmented character waveform, array data of peak intervals is generated (the array data generation process by the array data generating section). Then, the array data of peak intervals is compared with the standard array data of peak intervals stored in the standard waveform database 102 (the comparison process by the comparing section) for magnetic character recognition.

The standard waveform database 102 described above is a memorizing means such as an EEPROM, a flash memory, etc., which functions as an array data memory section for storing standard array data of peak intervals to be used in an array data preparation process. Concretely to describe, the standard waveform database 102 stores an array pattern of a plurality of intervals between peaks that are included in a standard character waveform of each magnetic character as standard array data of peak intervals; in accordance with a standard waveform that is used as a datum for reading a character string, including a plurality of magnetic characters printed with magnetic ink, by a magnetic head. Furthermore, the standard waveform database 102 stores not only the standard array data of peak intervals but also the standard numbers of peaks included in the standard character waveforms.

The standard array data of peak intervals may be prepared beforehand out of an array pattern of a plurality of intervals between peaks that are included in a standard character waveform of each magnetic character, but not limited to the configuration described above. For example, in the method for magnetic character recognition described in at least an embodiment of the present invention; an array data preparation process for preparing the standard array data of peak intervals in accordance with the array pattern of the plurality of intervals between peaks that are included in the standard character waveform of each magnetic character may be provided; being based on the standard waveform that is used as a datum for reading a character string, including a plurality of magnetic characters printed with magnetic ink, by a magnetic head.

Generally, in the standard array data of peak intervals stored in the standard waveform database 102; all peaks that exceed the prescribed threshold are detected in the extent from the forefront peak position of the character to that of the next character, and distances between peaks are calculated to form array data (vector) of distances between peaks. The vector of distances between peaks has a specific pattern for each character, and standard data for each character is prepared in the check reader. Then, the generated vector of distances between peaks is compared one by one with the standard pattern vector (which is a vector of the array data of peak intervals); and consequently a character having high similarity, i.e., a character corresponding to array data of peak intervals having high coincidence, can be correlated with the character that the extent expresses (can be identified as a read character).

Furthermore, the magnetic character recognition apparatus 1 in accordance with the present embodiment may be equipped with other database storing standard array data of peak intervals compatible with various factors of deformation in addition to the standard waveform database 102. Namely; when no character can be identified uniquely at an early stage, a comparison may be made with a second or third database.

(Magnetic Character Recognition Method)

FIG. 3 is a flowchart showing a general workflow of a magnetic character recognition method in accordance with at least an embodiment of the present invention.

As shown in FIG. 3, smoothing operation is carried out at first in the magnetic character recognition method in accordance with the embodiment (Step S1). Specifically, an entire part of the MICR waveform is smoothed by means of a moving-average method and the like to remove high-frequency noise, so as to enable making a waveform comparison without bad influence by the noise.

Subsequently, peak detection is carried out (Step S2). Specifically, all peaks, namely all local maximum and minimum values, included in the MICR regeneration waveform are detected.

A positive peak is detected as an upward convex pattern. That is to say; where a signal output at the present point "t" is expressed as "Amp(t)" and a signal output at the next point is expressed as "Amp(t+1)", the difference between the two points is described as "$\Delta(t)$=Amp(t+1)−Amp(t). Then, if "$\Delta(t)$" is greater than 0 and "$\Delta(t+1)$" is less than 0, it is determined that "Amp(t+1)" is a positive local maximum value. Meanwhile, a negative peak is detected as a downward convex pattern. That is to say; if "$\Delta(t)$" is less than 0 and "$\Delta(t+1)$" is greater than 0, it is determined that "Amp (t+1)" is a negative local maximum value (i.e., a local minimum value).

Such a positive peak and a negative peak appear alternately. Every time when a peak is detected; an index "t", a signal output "Amp (t)", and a polarity "Sgn" of the peak are saved. Incidentally, if one peak is formed with continuous output levels of the same value, the peak has a trapezoidal shape. In such a case, a beginning point and an end point of the flat peak part are calculated, and then a middle position between the two points is determined to be a peak point. Thus, a peak point can be detected accurately even when an MICR magnetic regeneration output of the check is saturated.

Subsequently, a peak threshold is determined (Step S3). The peak threshold is used for judging whether a peak included in the regeneration waveform is noise or a true peak. Even when a signal output value is assumed to be a peak, the signal is eventually judged to be noise if the signal output level does not reach the level of the peak threshold and the signal is not adopted in this case. As a result, this makes it possible to carry out magnetic character recognition with high accuracy, being free from bad influence by such noise.

FIG. 4 is a flowchart describing details of operation of determining the peak threshold at Step S3 in FIG. 3. In FIG. 4, an average value "Pav" of an entire part of the regeneration waveform is calculated (Step S11) at first. Among the peaks obtained through operation of the peak detection (Step S2 in FIG. 3), extracted are only the peaks whose level values "Pk" satisfy a condition of "Pav−R≦Pk≦Pav+R" (Step S12), where "R" is an appropriate value (>0). Then, an average "Pm" and a standard deviation "Ps" of the values of the extracted peaks are calculated (Step S13). Preferably, an appropriate value is adopted for the value "R", taking into account the characteristics of the magnetic regeneration circuit system.

Finally, the peak threshold "Ath" is calculated by using a formula "Ath=Pm+δ×Ps" (Step S14). A value "3" or "4" is adopted for the value "δ". Accordingly, the peak value can be appropriately determined, being free from bad influence by fluctuation of signal levels.

As described above; for determining the peak threshold "Ath" in the flowchart of FIG. 4, all peak values included in the regeneration waveform are calculated. Then, the variance (or the standard deviation) of the values of the peaks, which exist within a certain range in relation to the average value of the regeneration waveform, is calculated; and the peak threshold is determined, being based on the variance value (or the standard deviation value).

Though the standard deviation value is used for determining the peak threshold "Ath" in the present embodiment, another value may be used instead. Namely, depending on if there exists any peak having intensity greater than a specified intensity level within a range for one character, it may be judged whether an objective part of the regeneration waveform is dealt with as a character region or a region with no signal. As a matter of convenience for explanation in FIG. 3, the operation of determination of peak threshold at Step S3 is described separately from operation of character segmentation. However, the operation of determination of peak threshold of Step S3 may be included in the operation of character segmentation of Step S4.

Subsequently, character segmentation is carried out (Step S4). FIG. 5 is a flowchart showing a detailed workflow of the character segmentation (Step S4) described in the flowchart of FIG. 3. Meanwhile, FIG. 6 illustrates an example of the MICR regeneration waveform data.

In the character segmentation, a forefront peak position of each character is detected at first. According to the standard specifications on MICR character printing, the forefront peak position of each character is defined to be a major peak having a positive polarity and an output value of a prescribed level or higher. Therefore, the MICR regeneration waveform is scanned from its beginning, and it is determined whether or not the level value at the peak "Pk" is a positive value being greater than the peak threshold "Ath". To specify the peak threshold "Ath", for example, an average of all positive peak values is calculated. Then, a 60% value of the average is set as the threshold "Ath".

In FIG. 5, "1" is substituted into the variables "i" and "k", and meanwhile a position index "IDX (i)", namely "IDX (1)", is substituted into "NEXTPEAK" (Step S21). When the level value "Pk (i)" is positive (The polarity function "Sgn (i)" is used to detect whether the value is positive or negative) and is greater than the peak threshold "Ath", it is determined whether or not the position index "IDX (i)" is greater than a value "NEXTPEAK−USIZE" (Step S22). If the position index is not greater than the value "NEXTPEAK−USIZE", it is determined that the position index "IDX (i)" at the time is not a character segmentation part. Then, after incrementing the variable "i" (Step S24), the operation returns to Step S22 and this cycle repeats until the variable "i" reaches "last".

On the contrary, if the position index "IDX (i)" is greater than the value "NEXTPEAK−USIZE" (i.e., the position index indicates a further advanced position than "NEXTPEAK−USIZE", and the level value "Pk (i)" is positive and greater than the peak threshold "Ath"), it is determined that the position index "IDX (i)" at the time is a character segmentation part. Then, the position index "IDX (i)" is substituted into "BGN (k)" (Step S23). Meanwhile, "IDX (i)+PITCH (Character interval)" is substituted into "NEXTPEAK" and the variable "k" is incremented for 1. Thus, the position index "IDX (1)" at "Pk (1)" shown in FIG. 6 is substituted into "BGN (1)", and the position index "IDX (17)" at "Pk (17)" shown in FIG. 6 is substituted into "BGN (2)". The same operation is repeated for "BGN (3)" and later.

Thus, detecting a forefront peak position of each character is repeated. At the time of exceeding an end of the MICR character waveform (Step S25: YES), the character segmentation quits. Incidentally, "USIZE" described above indicates how many points shall exist before the forefront peak for the character waveform segmentation. In other words, standard waveform data are generated in such a manner that a first peak is placed at a position of "USIZE-th" from the beginning. Therefore, a segmentation start point is to be placed at a position of "USIZE-th" before the forefront peak, and then a waveform having the same length as the length of the standard waveform is segmented.

At Step 22 in FIG. 5, until the position index "IDX (i)" reaches the value "NEXTPEAK(−USIZE)", each peak at the time is detected and the distance between the neighboring two peaks is sequentially memorized. On this occasion, the distance calculation between the neighboring two peaks is carried out only in terms of either positive peaks or negative peaks.

Thus, detecting a forefront peak position of each character and calculating the distance between the neighboring two peaks are repeated. At the time of exceeding the end of the MICR character waveform, the character segmentation quits. In the case of CMC7 fonts, one character is composed of 7 bars and 6 spaces. As a result, peak interval data of one character consists of 6 elements.

Where distances between peaks in relation to the "i-th" character are expressed as Di1, Di2, Di3, Di4, Di5, and Di6; those distances are D11=Pk(3)−Pk(1), D12=Pk(5)−Pk(3), . . . , D16=Pk(13)−Pk(11) in the example of FIG. 6.

First Embodiment

Subsequently, character recognition is carried out (Step S5 in FIG. 3).

Figure 8:
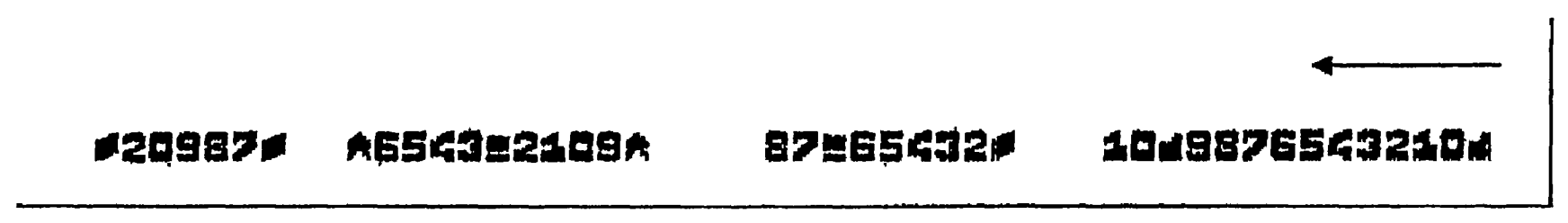

FIG. 7A is a flowchart showing a detailed workflow of the character recognition (Step S5) described in the flowchart of FIG. 3. Meanwhile, FIG. 8 is an example of a line of magnetic characters printed on a medium such as a check. The magnetic pattern is read in a direction from the right to the left in FIG. 8. The waveforms of magnetic regeneration signals read in such a manner are processed through the steps of the character segmentation described above. As a result, array data of the distances between neighboring two peaks shown below in "(Table 1)" is acquired (Step S31).

TABLE 1

|   | 6   | 5   | 4   | 3   | 2   | 1   |
|---|-----|-----|-----|-----|-----|-----|
| 1 | D16 | D15 | D14 | D13 | D12 | D11 |
| 2 | D26 | D25 | D24 | D23 | D22 | D21 |
| 3 | D36 | D35 | D34 | D33 | D32 | D31 |
| . | .   | .   | .   | .   | .   | .   |
| . | .   | .   | .   | .   | .   | .   |
| . | .   | .   | .   | .   | .   | .   |
| i | Di6 | Di5 | Di4 | Di3 | Di2 | Di1 |
| . | .   | .   | .   | .   | .   | .   |
| . | .   | .   | .   | .   | .   | .   |
| . | .   | .   | .   | .   | .   | .   |
| n | Dn6 | Dn5 | Dn4 | Dn3 | Dn2 | Dn1 |

Subsequently, for each character, the array data of the distances between neighboring two peaks is sequentially compared with each of an array data of a template (Standard array pattern) (Step S32) of "(Table 2)" (See below) that is prepared beforehand. Incidentally, in the present embodiment, normalized correlation is used as a scale for coincidence (coefficient of coincidence).

TABLE 2

|      | 6 | 5 | 4 | 3 | 2 | 1 |
|------|---|---|---|---|---|---|
| 1    | 1 | 0 | 0 | 0 | 1 | 0 |
| 2    | 0 | 1 | 1 | 0 | 0 | 0 |
| 3    | 1 | 0 | 1 | 0 | 0 | 0 |
| 4    | 1 | 0 | 0 | 1 | 0 | 0 |
| 5    | 0 | 0 | 0 | 1 | 1 | 0 |
| 6    | 0 | 0 | 1 | 0 | 1 | 0 |
| 7    | 1 | 1 | 0 | 0 | 0 | 0 |
| 8    | 0 | 1 | 0 | 0 | 1 | 0 |
| 9    | 0 | 1 | 0 | 1 | 0 | 0 |
| 0    | 0 | 0 | 1 | 1 | 0 | 0 |
| SI   | 1 | 0 | 0 | 0 | 0 | 1 |
| SII  | 0 | 1 | 0 | 0 | 0 | 1 |
| SIII | 0 | 0 | 1 | 0 | 0 | 1 |
| SIV  | 0 | 0 | 0 | 1 | 0 | 1 |
| SV   | 0 | 0 | 0 | 0 | 1 | 1 |

For example, in the case of the forefront character (at the right end) in FIG. 8, peak interval data of the character is D1=(D16, D15, D14, D13, D12, D11). Then, a correlation coefficient "R (1, 1)" is calculated between D1 and the first data of the standard array pattern; i.e., "T1=(1, 0, 0, 0, 1, 0)" that expresses a numeral "1".

$$R(1, 1) = \frac{\sum_{i=1}^{6}(D_{1i} - \overline{D}_1)(T_{1i} - \overline{T}_1)}{\sqrt{\sum_{i=1}^{6}(D_{1i} - \overline{D}_1)^2 \sum_{i=1}^{6}(T_{1i} - \overline{T}_1)^2}} \quad \text{(Formula 1)}$$

wherein, $$\overline{D}_1 = \frac{\sum_{i=1}^{6} D_{1i}}{6} \quad \overline{T}_1 = \frac{\sum_{i=1}^{6} T_{1i}}{6}$$

Subsequently, a correlation coefficient "R (1, 2)" is calculated with "T2" that expresses a numeral "2". In the same manner, other correlation coefficients "R (1, t)" are calculated with each template data down to the symbol "SV". In the end, the maximum value among all the correlation coefficients "Rm=max (R (1, t))" is obtained, and then a character corresponding to "t" is the result of recognition.

Depending on whether "Rm" is greater or smaller than a prescribed value, it is judged whether the coincidence is sufficient or not (Step S33). If "Rm" is smaller than the prescribed value, it is judged that the waveform includes an error and the character cannot be recognized (Step S35). Contrarily, if "Rm" is greater than the prescribed value, the character is identified (Step S34). Instead of concluding at Step S35 that the character cannot be recognized, a further waveform analysis may be carried out while focusing on, for example, only character candidates having close similarity.

Thus, at Step S33; in other words, the array data of peak intervals and the standard array data of peak intervals are compared by using a correlation coefficient. When (for example, the greatest) correlation coefficient showing the highest coincidence is greater than the prescribed value, the read character is identified with the character corresponding to the correlation coefficient.

Next, it is judged if the character is the end character or not (Step 36). When the character is not the end character, the operation returns to Step S31. On the other hand; when the character is the end character, the sub-routine finishes. As a scale for the similarity, a Sum-of-Absolute Difference may be used appropriately as required, in addition to the normalized correlation that is used in the present embodiment. Furthermore, though there are the standard specifications of E13-B and NC-7 for MICR characters, at least an embodiment of the present invention can be applied to either type of MICR characters.

Advantageous Effect of the First Embodiment

As described above; by using the magnetic character recognition apparatus 1 and the magnetic character recognition method in accordance with the first embodiment, each distance between neighboring two peaks in a magnetic regeneration waveform of one character is calculated so as to generate an array including data of the distance (array data of peak intervals). Then, the array is compared with a bit array dictionary (standard array data of peak intervals) of character patterns prepared beforehand to correlate the character with one of the character patterns. Therefore, it is not required to make a comparison on the dimension of peak intervals nor carry out any pattern conversion; and the magnetic character recognition apparatus 1 and the magnetic character recognition method ensure the improvement in accuracy of the magnetic character recognition.

Concretely to describe, being different from publicly known examples, this first embodiment does not require examining the dimension of each peak interval for converting the examined result into a distance pattern but simply calculating the correlation coefficient, and therefore the operation can be simplified. Furthermore, in a case where the peak interval is sized around the middle between a wide one and a narrow one, a second conversion process is prepared in the publicly known examples; meanwhile, in the first embodiment, the similarity as a total of the character is digitalized regardless of any fluctuation on the peak interval to enable the character recognition with high accuracy.

Furthermore when the character set to be used is changed, only preparation of the standard data for the new character set is required. Therefore, maintenance ability of the magnetic character recognition apparatus 1 can be enhanced.

Still further, in the step of determination of peak threshold (Step S3 in FIG. 3) or character segmentation (Step S4 in FIG. 3); depending on if there exists any peak having intensity greater than a specified intensity level within a range for one character, it is judged whether the part of the regeneration waveform is dealt with as a character region or a region with no signal. Therefore, the character recognition is unlikely to get influenced by noise. Then, the specified level of intensity is determined according to the variance of the values of the peaks, which exist within a certain range in relation to the average value of the regeneration waveform. Accordingly, the character recognition is unlikely to get influenced by level fluctuation of the noise that results from characteristics of the character recognition system.

Second Embodiment

Character recognition according to a second embodiment is described below next. Being provided with operations from Step S37 through Step S41 before those from Step S31 through Step S36 described above, the second embodiment ensures the character recognition with high accuracy even when there exists a low level of peak output in the regeneration waveform due to a void and/or waveform deformation due to a quasi peak.

Subsequently, the character recognition is carried out (Step S5 in FIG. 3).

FIG. 7B is a flowchart showing a detailed workflow of the character recognition (Step S5) described in the flowchart of FIG. 3. Meanwhile, FIG. 8 is an example of a line of magnetic characters printed on a medium such as a check. The magnetic pattern is read in a direction from the right to the left in FIG. 8. The waveforms of magnetic regeneration signals read in such a manner are processed through the steps of the character segmentation described above. As a result, array data of the distances between neighboring two peaks shown below in "(Table 1)" is obtained (Step S31).

TABLE 1

|   | 6   | 5   | 4   | 3   | 2   | 1   |
|---|-----|-----|-----|-----|-----|-----|
| 1 | D16 | D15 | D14 | D13 | D12 | D11 |
| 2 | D26 | D25 | D24 | D23 | D22 | D21 |
| 3 | D36 | D35 | D34 | D33 | D32 | D31 |
| . | .   | .   | .   | .   | .   | .   |
| . | .   | .   | .   | .   | .   | .   |
| . | .   | .   | .   | .   | .   | .   |
| i | Di6 | Di5 | Di4 | Di3 | Di2 | Di1 |
| . | .   | .   | .   | .   | .   | .   |
| . | .   | .   | .   | .   | .   | .   |
| . | .   | .   | .   | .   | .   | .   |
| n | Dn6 | Dn5 | Dn4 | Dn3 | Dn2 | Dn1 |

In the array data shown in "(Table 1)", the number of positive peaks and negative peaks each is 7 (when the character waveform segmented through the step of character segmentation is composed of 6 peaks). If the character waveform includes any error so that the number of peaks becomes different from the prescribed one (which is 7 in the present embodiment), the size of the array data vector of distances between peaks to be compared is different from the size of the standard pattern vector (which is inevitably 6 in the case of "CMC7"). If so, accordingly the correlation coefficient cannot be calculated under the condition as it is. Therefore, in the character recognition method according to the present embodiment, the operations from Step S37 through Step S41 of FIG. 7B are carried out before Step S31. Before explanation on Step S31, the operations from Step S37 through Step S41 are described in detail with reference to FIG. 9 and FIG. 10. FIG. 9 shows a waveform in which the number of peaks is less than the standard number of peaks, while FIG. 10 shows a waveform in which the number of peaks is more than the standard number of peaks.

In the operation of peak detection by the peak detecting section 104, only the peaks higher than the positive side threshold level or lower the negative side threshold level in FIG. 9 are extracted. Therefore, the peak positions at the positive side are, for example, [5870 5880 5890 5898 5924 5940] so that the number of peaks is 6 (by the peak counting process). Meanwhile, the peak positions at the negative side are, for example, [5884 5894 5904 5928 5944] so that the number of peaks is 5 (by the peak counting process). In this case, the number of peaks is less than 7 both at the positive and negative sides. Therefore, in the character recognition section 107; the number of peaks at the positive side is not 7 (Step S37: NO), the number of peaks at the negative side is not 7 either (Step S38: NO), and the number of peaks at the positive side is not equal to nor greater than 8 (Step S39: NO). As a result, the operation proceeds to the measures for the insufficient number of peaks (Step S41). In the measures for the insufficient number of peaks, the positive side threshold level is gradually lowered from the line position shown in FIG. 9 toward the zero level while the number of peaks at the positive side being checked to see if it is 7. When the number of peaks has become equal to 7, the measures stop. In a similar way as for the positive side, the negative side threshold level is gradually raised from the line position shown in FIG. 9 toward the zero level while the number of peaks at the negative side being counted to stop the measures when the number of peaks has become equal to 7. If both the numbers of peaks at the positive and negative sides do not reach 7, it is judged that reading operation is disabled. In any other case, matching operation on the array data vector of distances between peaks is carried out (the operation proceeds to Step S31) for the side(s) where the number of peaks has become equal to 7. If a score exceeds a threshold value at both the positive and negative sides, it is highly likely that one and the same character is matched at both the positive and negative sides. When the number of peaks is less than 7 at either of the sides, the side with a score having exceeded the threshold is applied. When the score is less than 7 at both the positive and negative sides; the character is dealt with as an unreadable one, or a correlated character is adopted only if the character correlated with for the best score is the same at both the positive and negative sides. The steps from S31 through S36 are already described earlier and not explained again this time; and a concrete method to be applied may be decided according to convenience of the character recognition system and the quality level of media.

As a result of the measures for the insufficient number of peaks (Step S41), the peak positions at the positive side are [5870 5880 5890 5898 5908 5924 5940] (The 5th peak numbered from the left end is newly added, as an arrow indicates in FIG. 9) while the peak positions at the negative side are [5875 5884 5894 5904 5914 5928 5944] (The 1st and 5th peaks numbered from the left end are newly added, as arrows indicate in FIG. 9), and therefore the number of peaks is 7 at both the positive and negative sides. Accordingly, the array data vectors of distances between peaks are [10 10 8 10 16 16] and [9 10 14 16] at the positive side and negative side, respectively. In comparison with the standard data for '7' [0 0 0 0 1 1], these vectors result in the maximum scores 0.97 and 0.96. When the threshold is 0.8, both the scores exceed the threshold so that the character at the region is identified to be '7'.

On the other hand, if the number of peaks is equal to or greater than 8 at both the positive and negative sides, the operation proceeds to the measures for the excessive number of peaks that Step S40 shows in FIG. 7B. In FIG. 10, the peak position data at the positive and negative sides are [6771 6780 6789 6796 6806 6816 6826 6840] (The 3rd peak numbered from the left end is a quasi peak that one arrow indicates in FIG. 10) and [6776 6785 6792 6802 6810 6820 6830 6846] (The 3rd peak numbered from the left end is a quasi peak that the other arrow indicates in FIG. 10), respectively. The number of peaks is equal to 8 at both the positive and negative sides. Accordingly, the array data vectors of distances between peaks are [9 9 7 10 10 10 14] and [9 7 10 8 10 10 16] at the positive side and negative side, respectively. In relation to the peaks of the positive side, by summing up a couple of neighboring two values among 7 vector components (elements) and replacing the neighboring two values with the calculated sum, the following 6 vectors are generated; i.e., V1=[18 7 10 10 10 14], V2=[9 16 10 10 10 14], V3=[9 9 17 10 10 14], V4=[9 9 7 20 10 14], V5=[9 7 10 20 14], and V6=[9 9 7 10 10 24]. Matching each vector with one of the standard pattern vectors results in the scores as described below; 0.897 by V1 and 'S1', 0.965 by V2 and '1', 0.947 by V3 and '4', 0.894 by V4 and '3', 0.894 by V5 and '7', and 0.685 by V6 and '3' as well as '7'. When V2 resulting in the maximum score is adopted, the character '1' is output as a result. A right result can be calculated in this way.

Thus, in the second embodiment, the operations from Step S37 through Step S41 enables character recognition with high accuracy even when there exists a low level of peak output in the regeneration waveform due to a void and/or waveform deformation due to a quasi peak.

The operations of Step S40 and Step S41 described above work as an example of the peak number adjusting process; in which the number of peaks obtained through the peak counting process is compared with the standard number of peaks included in the standard character waveform, and an adjustment is so made as to equalize these two numbers of peaks. Particularly, in the operations of Step S40, these two numbers of peaks are equalized by changing the prescribed threshold (Refer to FIG. 9). Meanwhile, in the operations of Step S41, these two numbers of peaks are equalized by summing up a couple of neighboring two peak intervals in the array pattern (i.e., the array data vectors of distances between peaks described above) (Refer to FIG. 10). Though the number of peaks is detected at both the positive and negative sides in the peak counting process described above, it may be detected only at one of the two sides.

Subsequently, the operation proceeds to Step S31 in FIG. 7B. The steps from S31 through S36 are already described earlier and not explained again this time.

Advantageous Effect of the Second Embodiment

As described above; by using the magnetic character recognition apparatus 1 and the magnetic character recognition method in accordance with the second embodiment, each distance between neighboring two peaks in a magnetic regeneration waveform of one character is calculated so as to generate an array including data of the distance (array data of peak intervals). Then, the array is compared with a bit array dictionary (standard array data of peak intervals) of character patterns prepared beforehand to correlate the character with one of the character patterns. Therefore, it is not required to make a comparison on the dimension of peak intervals nor carry out any pattern conversion; and the magnetic character recognition apparatus 1 and the magnetic character recognition method ensure the improvement in accuracy of the magnetic character recognition.

Concretely to describe, being different from publicly known examples, this second embodiment does not require examining the dimension of each peak interval for converting the examined result into a distance pattern, and calculating the correlation coefficient enables character recognition; and therefore the operation can be simplified. Furthermore, in a case where the peak interval is sized around the middle between a wide one and a narrow one, a second conversion process is prepared in the publicly known examples; meanwhile, in this embodiment, the similarity as a total of the character is digitalized regardless of any fluctuation on the peak interval to enable the character recognition with high accuracy.

Furthermore, an adjustment is so made as to equalize the number of peaks included in the character waveform and the standard number of peaks included in the standard character waveform (Refer to FIG. 9 and FIG. 10). Therefore, the character recognition is unlikely to get influenced by damage on peaks due to a void, spot, etc., and/or waveform deformation due to a quasi peak; and eventually at least an embodiment of the present invention ensures the further improvement in accuracy of the magnetic character recognition.

The operations described in FIG. 9 change the prescribed threshold level, while the operations described in FIG. 10 sum up a couple of neighboring two values of vector components. These software operations are simple and relatively light-duty, and therefore they prevent the peak number adjusting process from becoming complex and heavy-laden.

Though the characters printed on the medium are numerals and symbols in the embodiment described above, alphabet characters may also be used in some cases depending on the type of media. In such cases, a ratio of wide peak intervals to narrow peak intervals in the characters is altered. Therefore, publicly known examples need to add the operational logic according to the alphabet characters. However, the present embodiment only needs to add a section for the alphabet characters to the standard data table of "(Table 2)", and it can flexibly deal with variation of the objects for character recognition.

The method and apparatus for magnetic character recognition in accordance with at least an embodiment of the present invention are useful for enabling improvement in accuracy of the magnetic character recognition.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for magnetic character recognition comprising:
preparing standard array data of peak intervals, out of an array pattern of a plurality of intervals between peaks that are included in a standard character waveform of each magnetic character, in accordance with a standard waveform that is used as a datum for reading a character string, including a plurality of magnetic characters printed with magnetic ink, by a magnetic head;
generating a regeneration waveform out of a character string of magnetic characters printed on a surface of an information data recording medium;
segmenting a character waveform of each magnetic character out of the regeneration waveform;
generating array data of peak intervals out of an array pattern of a plurality of intervals between peaks that are included in the character waveform; and
comparing the array data of peak intervals with the standard array data of peak intervals;
wherein, based on a comparison result of comparing the array data of peak intervals with the standard array data of peak intervals, a read character is identified with a character corresponding to an array data of peak intervals that shows a highest coincidence
wherein, when a peak has intensity greater than a specified intensity level within a range for one character, the segmenting a character waveform further comprises judging whether a part of the regeneration waveform is dealt with as a character region or a region with no signal.

2. The method for magnetic character recognition according to claim 1, wherein the read character is identified with a character corresponding to a correlation coefficient showing the highest coincidence when the array data of peak intervals and the standard array data of peak intervals are compared by using a correlation coefficient.

3. The method for magnetic character recognition according to claim 1, wherein all peak values included in the regeneration waveform are calculated and the segmenting a character waveform further comprises calculating variance of the peak values, which exist within a certain range in relation to the average value of the regeneration waveform, and then the specified intensity is determined according to the variance.

4. A method for magnetic character recognition comprising:
generating a regeneration waveform out of a character string including a plurality of magnetic characters printed on a surface of an information data recording medium with magnetic ink;
segmenting a character waveform of each magnetic character out of the regeneration waveform;
counting the number of peaks included in the character waveform in accordance with a prescribed threshold;
comparing the number of peaks obtained by counting the number of peaks with a standard number of peaks included in a standard character waveform;
making an adjustment so as to equalize the number of peaks and the standard number of peaks;
generating array data of peak intervals out of an array pattern of a plurality of intervals between peaks that are included in the character waveform, being based on a number of peaks equalized to the standard number of peaks; and
comparing the array data of peak intervals with the standard array data of peak intervals generated in accordance with a standard waveform that is used as a datum for reading a character string, including a plurality of magnetic characters printed with magnetic ink, by a magnetic head;
wherein, based on a comparison result of comparing the array data of peak intervals with the standard array data of peak intervals, a read character is identified with a character corresponding to an array data of peak intervals that shows high coincidence
wherein the making an adjustment so as to equalize the number of peaks and the standard number of peaks further comprises summing up a couple of neighboring two peak intervals in the array pattern if the number of peaks is more than the standard number of peaks.

5. The method for magnetic character recognition according to claim 4 wherein the peak counting process detects the number of peaks at both the positive and negative sides of the regeneration waveform.

* * * * *